United States Patent [19]
Rabe

[11] 3,957,278
[45] May 18, 1976

[54] INJECTION MOLDED SEAL AND PRODUCTION THEREOF

[75] Inventor: Jürgen Rabe, Herzogenaurach, Germany

[73] Assignee: Industriewerk Schaeffler OHG, Herzogenaurach, Germany

[22] Filed: Oct. 20, 1972

[21] Appl. No.: 299,635

[30] Foreign Application Priority Data
Nov. 17, 1971 Germany.............................. 2157015

[52] U.S. Cl................................. 277/227; 277/205
[51] Int. Cl.²......................................... F16J 15/32
[58] Field of Search........ 277/227, 166, 180, 235 B, 277/205, 153; 264/255

[56] References Cited
UNITED STATES PATENTS

| | | |
|---|---|---|
| 2,470,089 | 5/1949 | Booth .................................. 264/245 |
| 2,485,323 | 10/1949 | Schwartz............................. 264/245 |
| 2,538,198 | 1/1951 | Hosford........................... 277/227 X |
| 3,305,895 | 2/1967 | Ludwig................................ 264/255 |
| 3,493,645 | 2/1970 | Sanderson et al............ 277/153 UX |
| 3,608,004 | 9/1971 | Borisuck............................. 265/255 |

*Primary Examiner*—Samuel B. Rothberg
*Attorney, Agent, or Firm*—Hammond & Littell

[57] ABSTRACT

Novel seal for bearings for example made of an injection moldable material such as plastic or rubber with the sealing lip support integral with the sealing lip and a process for the preparation of the said seal.

2 Claims, 4 Drawing Figures

Fig.1
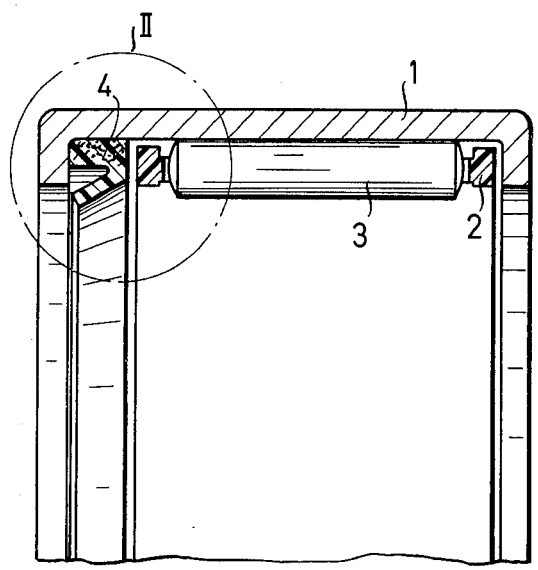
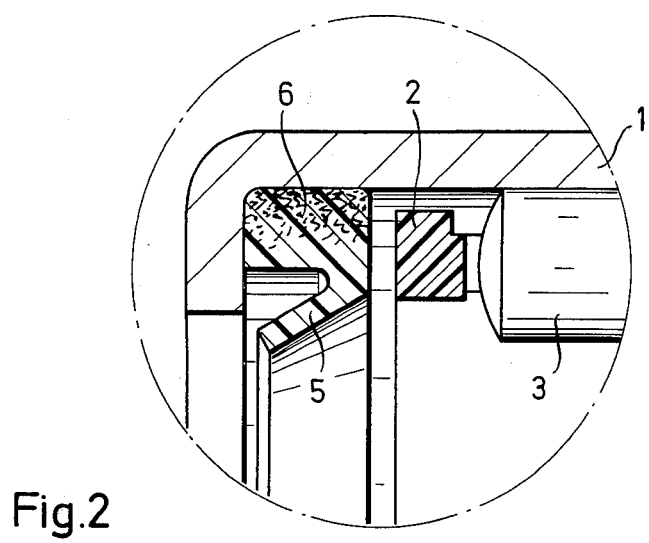
Fig.2

Fig. 3a
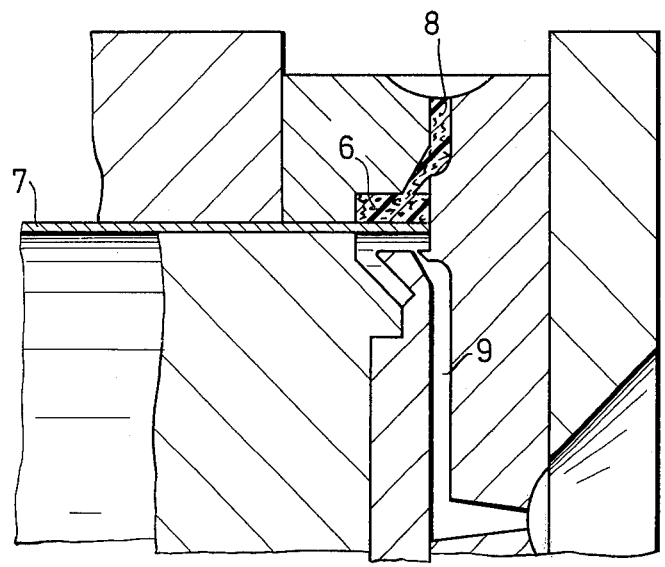
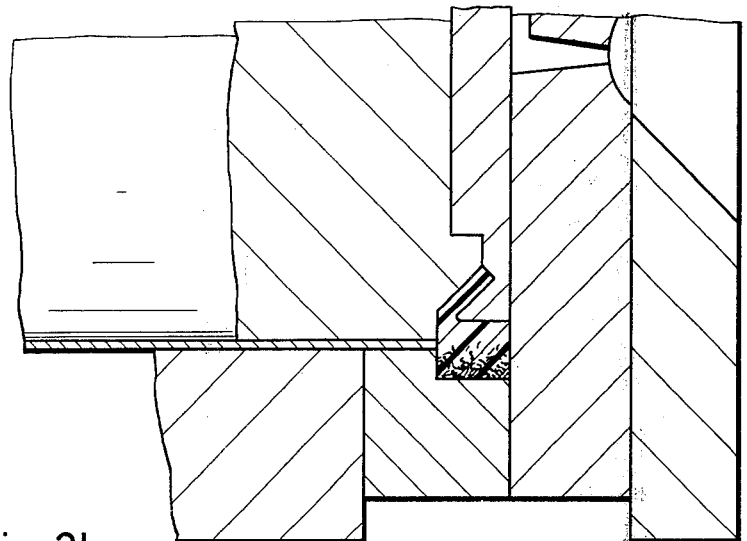
Fig. 3b

INJECTION MOLDED SEAL AND PRODUCTION THEREOF

STATE OF THE ART

In known bearing seals of this type, the sealing lip support and the sealing lip are made of the same material with the same strengths and the same elasticity. This means that the sealing lip support must have the same high degree of elasticity as the sealing lip which is necessary for a good sealing effect. A sealing lip support which is elastic is disadvantageous when the seal must be pressed in during assembly or when a close fit of the seal with another part is required, particularly with the race of a roller bearing.

One attempt to eliminate this disadvantage has been to reinforce the seal in the area of the sealing lip support with metal rings. Another attempt comprises a seal for roller bearings consisting of a holder and a sealing lip in which the said lip is sprayed onto the holder with an insert tool or joined to the holder with a snap or adhesive joint means. These known seals require a complicated manufacture as the reinforcing elements or the holders must be separately produced and then joined with the sealing lip proper in an additional operation.

OBJECTS OF THE INVENTION

It is an object of the invention to provide a simply produced seal without the disadvantage of equal elasticity for the sealing lip support and the sealing lip per se which can be produced in single step injection molding process.

It is a further object of the invention to provide a novel one-step injection-holding process for producing a seal means.

These and other objects and advantages of the invention will become obvious from the following detailed description.

THE INVENTION

The novel seal of the invention is comprised of a sealing lip support and a sealing lip of different injectable materials bonded together in the hot plastic state by injection molding.

The possible variations of the invention include a seal with sealing lip support made of an injectable material of greater elasticity than the sealing lip or that the sealing lip support may be made of a fiber-reinforced material and the sealing lip is made of an injectable material without fiber-reinforcement. It is also possible for the sealing lip and sealing lip support to be made of fiber-reinforced, injectable material and to make the fiber concentration much greater in the support than the lip or to make the sealing lip of an injectable material with a lower modulus of elasticity than the support.

The method of the invention for the preparation of the seal comprises separately injecting into an injection mold material for the sealing lip support and the sealing lip and bonding the two said materials in the hot plastic state, the two materials having a different elasticity.

In one method of the invention, the zone in the injection mold for the sealing lip support is separated from the zone of the sealing lip by a displaceable partition and the material for the support is first injected into the mold by a sprue hole and then another material for the sealing lip is injected by a second sprue hole and the partition is then removed from the injection mold. It is possible to inject both materials simultaneously and then to remove the partition at the end of the injection molding process or to inject one of the materials, remove the partition and then inject the second material.

In another method of the invention for a seal with a sealing lip less rigid than the sealing lip support, an injectable, fiber-reinforced material is injected through a single sprue hole into an injection mold with baffle barriers in the sprue hole effecting at least a partial separation of the material flowing in the zone of the sealing lip. The reduction of the fiber concentration in the sealing lip is a result of the physical-rheological relationship of injectable fiber-reinforced rubber or plastic melts of low viscosity when they pass through narrow shearing gaps formed by baffle barriers.

In a seal of the invention, the sealing lip support may have a greater capacity to withstand stress and a greater rigidity than the sealing lip whereby the seal meets all requirements required during pressing-in of the seal and with regard to close fits with another part. However, the sealing lip may be highly elastic and is not impaired in its sealing effect and its capacity to retain its shape.

The material for the sealing lip and its support may be natural rubber, synthetic rubber, thermoplastic resins, elastomers and duroplastic resins. Examples of reinforcing fibers for fiber-reinforced injectable materials are glass fibers, textile fibers and metallic fibers or so-called whiskers.

By bonding the materials for the sealing lip and its support in the hot plastic state under the influence of temperature and pressure, the finished seal will not separate and shows no recognizable distinct separation in the transition area of sealing lip and its support.

Referring now to the drawing:

FIG. 1 is a partial longitudinal section through a needle bearing with a seal of the invention and;

FIG. 2 is an enlarged detail of the seal in Circle V of FIG. 1.

FIGS. 3a and 3b are partial cross-sectional views of the mold for the producing of the seal made of different materials.

In FIGS. 1 and 2, a needle bearing which is used to illustrate one possible application of the seal of the invention is comprised of a plurality of needle rollers 3 accommodated in cage 2 and rolling upon outer race 1. The needle bearing is sealed on one end with seal 4 consisting of a sealing lip 5 and a sealing lip support 6. The reinforcing fibers are schematically illustrated in seal lip support 6 while the sealing lip 5 is free of reinforcing fibers and a decreasing concentration of the fibers can be seen in the transition area from support 6 to lip 5.

FIGS. 3a and 3b illustrate an injection molding apparatus for the production of a seal of the invention. In FIG. 3a, the apparatus is shown in the first stage wherein the material for the sealing lip support 6 is injected and in FIG. 3b, the apparatus is shown in the second stage wherein the material for the sealing lip is injected. At the start of the manufacture, separating sleeve 7 is pushed to the right in the injection mold to separate the area of support 6 from the area of sealing lip 5 and the fiber-reinforced material for support 7 is injected through a first sprue hole 8. The second material for sealing lip 5 injected through a second sprue hole 9 and with the separating sleeve 7 displaced towards the left, the two materials in the hot plastic state are bonded firmly together. The two materials may be injected simultaneously or one after the other.

Various modifications of the seals of the invention such as different forms and shapes of the seals and different applications for the seal may be made without departing from the spirit or scope thereof and it is to be understood that the invention is to be limited only as defined in the appended claims.

I claim:

1. A seal made of moldable material comprising a sealing lip support integral with a sealing lip bonded together in the hot plastic state, the sealing lip support being made of moldable, fiber-reinforced material and the sealing lip being made of the same moldable material without fiber reinforcement whereby the lip and lip support have different elasticities.

2. A seal made of moldable material comprising a sealing lip support integral with a sealing lip bonded together in the hot plastic state, the sealing lip and the sealing lip support being made of the same fiber-reinforced material with the fiber concentration being much greater in the lip support than the lip whereby the lip and lip support have different elasticities.

* * * * *